United States Patent [19]

Hyden et al.

[11] Patent Number: 5,774,461

[45] Date of Patent: Jun. 30, 1998

[54] MEDIUM ACCESS CONTROL AND AIR INTERFACE SUBSYSTEM FOR AN INDOOR WIRELESS ATM NETWORK

[75] Inventors: Eoin Hyden, Madison; Mani Bhushan Srivastava; John Andrew Trotter, both of Chatham; Prathima Agrawal, New Providence; Paul Krzyzanowski, Fanwood, all of N.J.

[73] Assignee: Lucent Technologies Inc., Murray Hill, N.J.

[21] Appl. No.: 534,761

[22] Filed: Sep. 27, 1995

[51] Int. Cl.$^6$ .................................................. H04L 12/56
[52] U.S. Cl. ......................... 370/329; 370/395; 370/450
[58] Field of Search ............................. 370/18, 60, 60.1, 370/94.2, 95.1, 95.3, 85.4, 94.1, 319, 320, 328, 335, 349, 395, 396, 399, 398, 338, 329, 330, 450; 379/59, 60; 455/33.1, 54.1, 54.2; 371/37.01, 38.1

[56] References Cited

U.S. PATENT DOCUMENTS

| | | | |
|---|---|---|---|
| 4,972,506 | 11/1990 | Uddenfeldt | 455/54.1 |
| 5,168,498 | 12/1992 | Adams et al. | 370/95.1 |
| 5,406,550 | 4/1995 | McTiffin | 370/60.1 |
| 5,434,853 | 7/1995 | Hemmady et al. | 370/95.1 |
| 5,434,859 | 7/1995 | Levardon | 370/60 |
| 5,481,544 | 1/1996 | Baldwin et al. | 370/94.1 |
| 5,487,065 | 1/1996 | Acampora et al. | 370/94.2 |
| 5,519,707 | 5/1996 | Subramanian et al. | 370/399 |
| 5,553,069 | 9/1996 | Ueno et al. | 370/329 |
| 5,579,480 | 11/1996 | Cidon et al. | 395/200.1 |

OTHER PUBLICATIONS

P. Agrawal, et al., "A Testbed For Mobile Network Computing," published in Proc. IEEE Intl. Conference on Communications, ICC 1995.

*Primary Examiner*—Chau Nguyen

[57] ABSTRACT

A system for delivering packetized data in a network dynamically assigns a unique address to a mobile unit, allocates bandwidth within a wireless link by a token scheme and provides forward error correction for the packet. The system wirelessly transports the packets between a base station and an end point which is responsive to a link cell for linking the base station and the end point. The link cell contains a header and a body. The header in turn contains a forward error correction code, a radioport id and a token. The forward error correction code provides error detection and error correction that relies solely on a one-way communication of data bits from a sender to a receiver. The radioport id is a logical id assigned such that each radio-port in a vicinity has a unique id. The token enables the wireless transportation over a selected channel of the packets between the base station and the end point. The token is utilized to allocate the selected channel from a plurality of channels. A method is also described for delivering packetized data between an endpoint and a base station.

12 Claims, 6 Drawing Sheets

MEDIUM ACCESS CONTROL AND AIR INTERFACE SUBSYSTEM FOR AN INDOOR WIRELESS ATM NETWORK

FIELD OF THE INVENTION

This invention relates to the field of packet communication, and more particularly to the field of packet communication with a wireless endpoint.

BACKGROUND OF THE INVENTION

Continual progress with wireless technology and high-speed integrated service wired networking promises to provide mobile users with omnipresent multimedia information access in the near future. Although wireless access has previously been used to provide tetherless access to mobile users, this has been done principally to address the requirements of two specific and disjoint domains: voice telephony and indoor data LANs. Cellular telephone networks have extended the domain of telephone service over a wireless last hop, while mobile-IP LANs such as WaveLAN from AT&T, and RangeLAN from Proxim, do the same for indoor users of TCP/IP data networks.

In networks capable of providing tetherless multimedia computing and information access it appears increasingly likely that the core of such networks will be based on the emerging Asynchronous Transfer Mode (ATM) cell switching networks that provide integrated support for voice, video, data, and other multimedia traffic. The use of the Virtual Channel Connection model in ATM makes it possible to provide quality of service guarantees to a specific connection. This suggests that there is a need to rethink the architecture of the wireless last hop as well. In particular, it appears to make sense to follow the ATM Virtual Channel Connection model over the wireless hop as well, thereby allowing the service quality guarantees made in the wired network to be extended end-to-end, spanning the wireless hop. It is an open question, which is presently the subject of research, as to whether the wireless last hop should use the ATM Virtual Channel Connection model, or use the connectionless delivery model as is done by present-day wireless IP LANs.

Assuming that it is logical to extend the ATM Virtual Channel Connection model over the wireless hop, an indoor wireless multimedia network has been developed at AT&T Bell Laboratories. The network, named Seamless Wireless ATM Networking (SWAN), seeks to provide continual network connection to mobile heterogeneous ATM end-points in an indoor office setting. Such end-to-end ATM connectivity requires the ability to establish, reroute, and tear-down Virtual Channel Connections to and from mobile hosts and the ability to provide service quality guarantees for these Virtual Channel Connections in the presence of mobility.

While wireless networks with end-to-end ATM are still in the development stage, cellular telephone networks, indoor wireless data LANs, and outdoor cellular metropolitan-area data networks such as Metrocom's Ricochet are three broad categories of wireless networks that commercially exist. Cellular telephone networks are connection oriented, and use either the older analog frequency division multiple access, or use the newer digital time or code division multiplexing. Perhaps more relevant to SWAN are the techniques used to reroute connections when mobile users roam from cell to cell, particularly in the case of the newer microcellular networks.

Closer to SWAN's domain are the indoor wireless data LANs such as WaveLAN from AT&T and RangeLAN from Proxim. The radios used in these networks are typically ISM band radios, like SWAN's radios, and may be either frequency hopping spread spectrum based, or direct sequence spread spectrum based. Frequency hopping based radios are a relatively recent development, and smart algorithms for the control of frequency hopping are still proprietary. In any event, these wireless LANs are optimized for mobile IP or mobile IPX traffic, as opposed to mobile ATM traffic. The Medium Access Control (MAC) and physical control layers in these wireless LANs are the subjects of the proposed IEEE 802.11 standard. In a broad sense, all of these networks operate in a peer-to-peer fashion with the mobile access points and the wired network access points operating as peers in a shared broadcast channel. This concept is somewhat similar to what occurs in an ethernet, and in fact the Medium Access Control layers in these wireless LANs are also ethernet variants in that the multiple access is based on Carrier Sense Multiple Access (CSMA) enhanced with collision avoidance and handshaking. Polling based Medium Access Controls have also been proposed for use in wireless data LANs.

Although considerable progress has been made with the use of wireless technology and broadband networks, many technical problems remained to be solved before a vision of omnipresent tetherless access to multimedia information can be realized. Accordingly, there is a need to provide a reliable system of controlling the linking of the base station and mobile unit for transporting data packets.

SUMMARY OF THE INVENTION

In accordance with the present invention, there is provided a system for delivering packetized data in a network, wherein the system dynamically assigns a unique address to the mobile unit, allocates bandwidth within the wireless link by a token scheme and provides forward error correction for the packet.

The system has a means for wirelessly transporting the packets between a base station and an end point which is responsive to a link cell for linking the base station and the end point. The link cell contains a header and a body. The header in turn contains a forward error correction code, a radioport id and a token. The forward error correction code provides error detection and error correction that relies solely on a one-way communication of data bits from a sender to a receiver. The radioport id is a logical id assigned such that each radio-port in a vicinity has a unique id. The token enables the wireless transportation over a selected channel of the packets between the base station and the end point. The token is utilized to allocate the selected channel from a plurality of channels.

A method is described for delivering packetized data between an endpoint and a base station. The method involves the step of providing a means for linking a base station and an end point. Then linking the base station and the end point. Then transporting wirelessly the packets between the base station and the end point.

DESCRIPTION OF THE DRAWINGS

A more complete understanding of the present invention may be obtained from consideration of the following description in conjunction with the drawings in which.

DETAILED DESCRIPTION OF VARIOUS ILLUSTRATIVE EMBODIMENTS

Although the present invention is particularly well suited to a packet communication system having a Virtual Channel Connection ATM extended to a wireless endpoint, and shall be described with respect to this application, the methods and apparatus disclosed here can be applied to other packet communication systems with a wireless endpoint.

Figure 1:
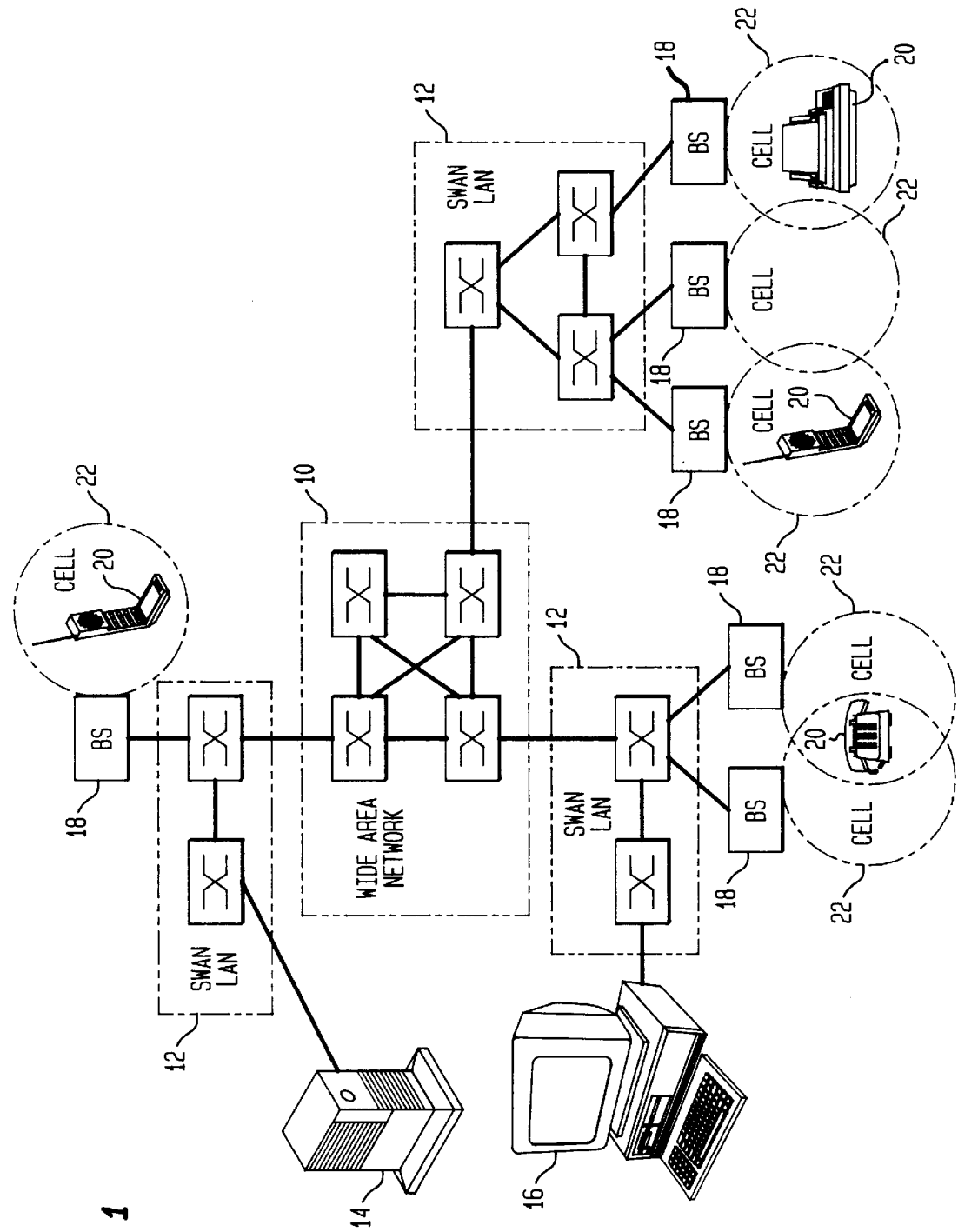
FIG. 1 is a block diagram of a network communication model of a SWAN wireless ATM network.

Referring now to FIG. 1 there is shown a high level view of the network communication model adopted by the SWAN mobile networked computing environment at AT&T Bell Laboratories. A hierarchy of wide-area 10 and local-area 12 wired ATM networks is used as the back-bone network, while wireless access is used in the last hop to mobile hosts. In addition to connecting conventional wired server hosts 14 and client end-points 16, the wired backbone also connects to special switching nodes called base stations 18. The base stations 18 are equipped with wireless adapter cards, and act as a gateway for communication between nearby mobile hosts 20, which are also equipped with wireless adapters, and the wired network. The geographical area for which a base station acts as the gateway is called its cell 22, and given the intended use of SWAN in an office setting, the various base station 18 nodes are distributed in room-sized pico-cells. Network connectivity is continually maintained as users carrying a variety of mobile hosts 20 roam from one cell 22 to another. The mobile hosts 20 themselves range from portable computers equipped with a suitable wireless adapter, to dumb wireless terminals that have no or little local general-purpose computing resources. All mobile hosts 20 in SWAN, however, must have the ability to participate in network signaling and data transfer protocols. Lastly, a mobile unit 20 in SWAN sends and receives all its traffic through the base station 18 in its current cell 22.

A distinguishing feature of the SWAN system is the use of end-to-end ATM over both the wired network and the wireless last hops 24. This is in contrast to the use of connectionless mobile-IP in present day wireless data LANs. This design choice in SWAN was motivated by the realization that advances in compression algorithms together with increased bandwidth, provided by spatial multiplexing due to the use of pico-cells and higher bandwidth RF transceivers that are now available, can allow the transmission of packetized video to a mobile unit 20. Support for multimedia traffic over the wireless segment has therefore become a driving force in SWAN. Adopting the connection-oriented model of an ATM Virtual Channel Connection over the wireless hop as well allows quality of service guarantees associated with virtual channel connections carrying audio or video traffic to be extended end-to-end. In essence, the use of end-to-end ATM allows the wireless resource to be meaningfully allocated among the various connections going over a wireless hop.

Using ATM's Virtual Channel Connection model all the way through to a mobile host 20, however, results in the need to continually reroute ATM Virtual Channel Connections as a mobile host 20 moves. The small cell sizes and the presence of quality of service sensitive multimedia traffic make this problem particularly important in SWAN. Virtual Channel Connections carrying audio or video, as far as possible, need to be immune from disruptions as a mobile host 20 is hands-off from one base station 18 to a neighboring one. Of course, ATM signaling protocol needs to accomplish the task of Virtual Channel Connection rerouting with minimum latency, and SWAN's approach to this problem is based on Virtual Channel Connection extension coupled with loop removal and mobile initiated partial rebuilds. Of more particular interest is the fact that the lower level protocol layers dealing with wireless medium access must also accomplish the task of transferring a mobile unit 20 from one base station 18 to another with minimal latency. Low latency hand-off and allocation of wireless resources among various virtual connections are therefore tasks that need to be done in the wireless hop 24 in SWAN, in addition to the usual functionality of medium access control and air-interface operation.

Figure 2:
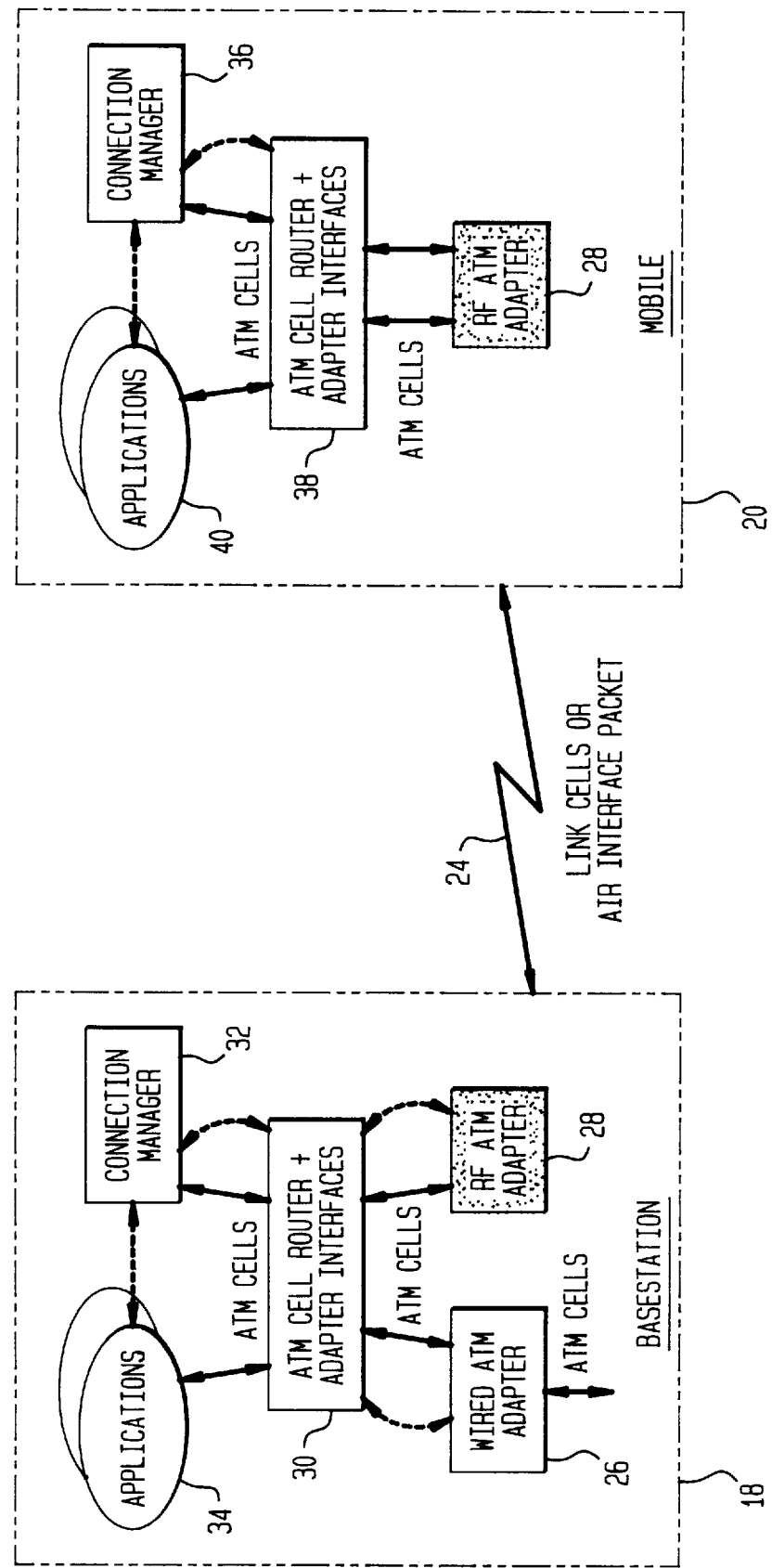
FIG. 2 is a block diagram of a last hop in a wireless ATM network.

FIG. 2 shows a block diagram of the wireless last hop 24 of a SWAN-like wireless ATM network. The primary function of the base station 18 is to switch cells among various wired 26 and wireless ATM 28 adapters attached to the base station 18—the base station 18 can be viewed as an ATM switch that has RF wireless ATM adapters on some of its ports. In SWAN, however, generic PCs and Sun workstations are used as base stations 18 by plugging in a wired ATM adapter card 26 and one or more RF wireless ATM adapter cards 28. The cell switching functionality is realized in software using a kernel-space-resident cell routing and adapter interface module 30, and a user-space-resident connection manager signaling module 32. The use of PCs and workstations for base stations 18 allows them to act as wired hosts as well, running application processes 34. In essence, base stations 18 in SWAN are nothing but computers with banks of radios interfaced.

At the other end of the wireless last hop 24 is the mobile unit 20 that too has a RF wireless adapter 28, a connection signaling manager module 36, and a module 38 that routes cells among various agents within the mobile unit. Although pictorially the mobile unit 20 may look like a base station 18 with no wired adapter and only one wireless adapter 28, this is not the complete truth. The connection manager 36 at the mobile unit 20 is different—for example, it does not have to provide a switch-like functionality. In addition, mobile units 20 such as dumb terminals may have only hardware agents acting as sinks as sources of ATM cells, as opposed to software processes. However, mobile units 20 that are more than a dumb terminal may run applications 40 as well.

Of particular interest is the RF ATM adapter 28 of the base station 18, the RF ATM adapter of the mobile unit 20 and their interconnection by an air interface packet (link cell) over the wireless last hop 24. A stream of ATM cells from the higher level ATM layers needs to be transported across the wireless link 24 between a mobile unit 20 and its base station 18. The issues that need to be addressed to accomplish the transport of ATM cells over the air can be classified into two categories: generic issues and ATM-specific issues.

Following are some of the problems that fall under the generic category: (1) Division of available bandwidth into channels (2) Distribution of channels among base stations (3) Regulation of access to a shared channel (4) Hand-off of mobile units from one base station 18 to another.

On the other hand, the following wireless hop problems are influenced principally by the needs of ATM: (1) Mapping of ATM cells to link cells, or air-interface packets (2) Format of air-interface packets (3) Impact of ATM cell loss due to noise and interference sources unique to wireless, such as inter-symbol interference, adjacent channel interference, frequency collision etc., and (4) Multiplexing and scheduling of different ATM Virtual Channel Connections in the same channel.

The answers to these problems depend partially on the restrictions imposed by the hardware, and in particular on the characteristics of the radio transceiver.

Figure 3:
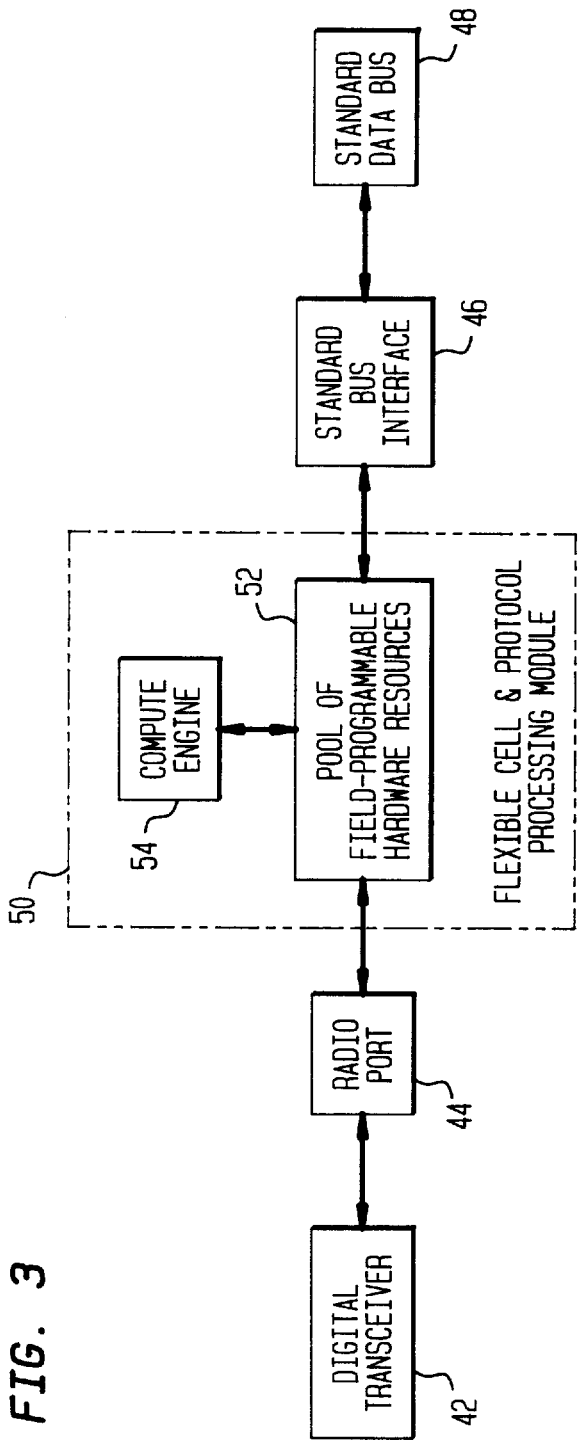
FIG. 3 is a block diagram of a reusable ATM wireless adapter architecture template.

The wireless hop in SWAN is based around the idea of a single reusable ATM wireless adapter architecture, shown in FIG. 3, that interfaces to one or more digital-in digital-out radio transceivers 42 on one side through a radio port interface 44, to a standard bus interface 46 coupled to a standard data bus 48 on the other side, and has a standard core module 50 sandwiched in between providing field-programmable hardware resources 52 and a software-programmable embedded compute engine 54 to realize the necessary data processing. Multiple implementations of this basic architecture could be made with differing form factor, different bus interfaces, and different radios, but all with the same core data processing module. This provides a uniform mechanism for making devices SWAN-ready. Implementations could range from PCMCIA adapter cards that are adjunct to laptop computers, to small-form factor cards for embedding in a wireless terminal, and to higher speed adapters with multiple radios for use in base stations. The adapter could be configured for algorithms by reprogramming the embedded software, and by reconfiguring the field-programmable hardware. System level board synthesis tools with interface synthesis and parameterized library capabilities, such as the SIERA system from Berkeley can be used to easily generate variations of the basic adapter architecture for different busses and radios. At present there exists one implementation of our standard architecture in the form of a card called Flexible Adapter for Wireless Networking (FAWN).

An article entitled "A Testbed For Mobile Network Computing" by P. Agrawal et al., published in Proc. IEEE Intl. Conference on Communications, ICC 1995, provides details of the architecture of SWAN and the FAWN adapter.

Figure 4:
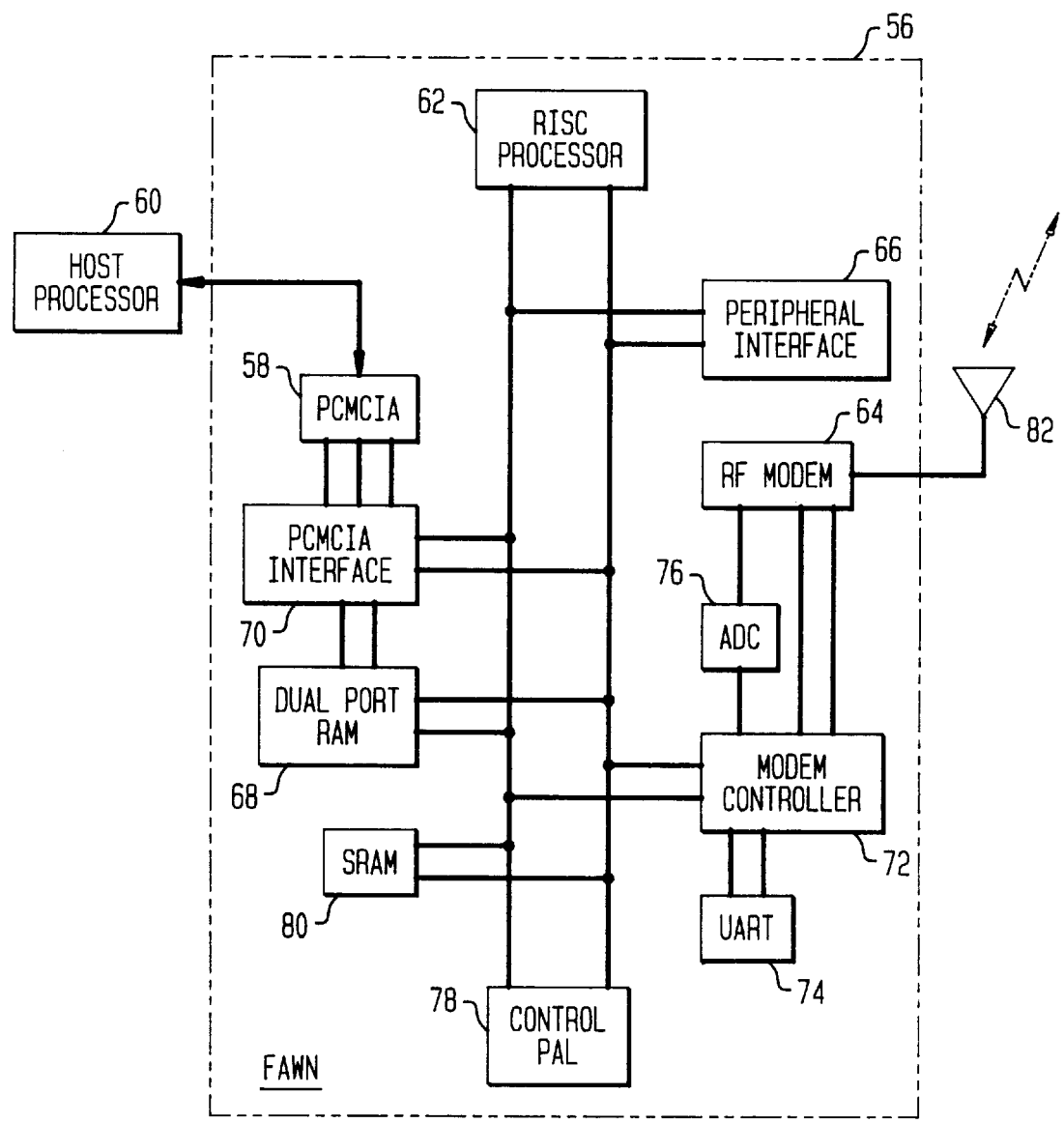
FIG. 4 is a block diagram of a FAWN adapter architecture.

Referring to FIG. 4, there is shown a block diagram of a FAWN adapter architecture. The FAWN card 56 uses a PCMCIA bus 58 to interface with the is host computer 60. A laptop computer with a PCMCIA slot can become a mobile host by plugging in a FAWN card 56.

The FAWN card 56 has a RISC processor 62, such as ARM 610 CPU, which is responsible for controlling the RF modem 64 and other peripherals through a peripheral interface 66. The FAWN card 56 is configured for use with the 2.4 GHz Industrial Scientific and Medical (ISM) band frequency hopping spread spectrum transceivers, although the transceiver interface can be easily modified by reprogramming some components, which is well known to one ordinarily skilled in the art. The RISC processor 62 operates at 20 MHz and provides sufficient processing capacity for performing the kernel, signaling and transport protocol functions.

The communication between the RISC processor 62 and the host computer 60, in a base station 18 or a mobile unit 20, utilizes a dual-port memory based interface 68 over the PCMCIA interface 70. The interface is implemented with a Field Programmable Gate Array (FPGA). There are two access modes, one mode accesses any of the CPU's peripherals, but takes longer as the interface must arbitrate for the FAWN CPU's internal bus. As each side of the dual port RAM 68 can be accessed at full speed by the host CPU and the FAWN CPU 62 the data transfers can occur at a maximum speed.

A modem controller 72 is implemented utilizing another FPGA and implements many of the low level functions necessary to support wireless access protocols. An RF modem 64, such as a 2.4 GHz FHSS modem, provides a logic level interface for data and control, as well as an analog received signal strength indicator. This band permits 83 channels of 1 MHz for frequency hopping. Currently a GEC Plessey modem can support 83 channels at a 625 Kbits/sec raw bandwidth and will support a 1.2 Mbits/sec bandwidth in another version. The modem's interface permits selection of 1 of the 83 channels, the power level, and 1 of 2 antennas. The modem 64 supplies a bit stream to a UART 74 during receive and accepts a bit stream during transmit. The UART 74 converts the bit stream from the modem 64 to bytes during receive, stripping the relevant synchronization bits and providing bytes to the controlling FPGA (modem controller) 72. During transmission the UART 74 adds synchronization bits and feeds the bit stream to the modem 64. The FPGA (modem controller) 72 includes four 64 byte buffers which store packets of data to and from the UART 74. This allows the UART 74 to asynchronously transmit and receive data without having to interrupt the FAWN CPU 62. The FPGA 72 (modem controller) includes a resettable counter operating at 1 MHz which can be utilized as a real time timer for protocol and task scheduling. An Analog to Digital Converter (ADC) 76 and low pass filter allow the received signal strength to be read by the FAWN CPU 62. A Control PAL 78 is contained within the FAWN adapter 56. The FAWN card 56 includes 4 Mbytes of SRAM 80 for program and data storage.

For practical purposes, therefore, the nature of the wireless hop in SWAN depends on the characteristics of the particular radio transceiver that is supported by the FAWN adapter 56. With respect to slow frequency hopping, the primary radio transceiver used in SWAN is the DE6003 radio from GEC Plessey. DE6003 is a half-duplex slow frequency hopping radio operating in the 2.4 GHz ISM band, and has a data rate of 625K bps. Further, the radio has two power levels, and has two selectable radio antennas 82. Legal requirements dictate that the radio must be operated in such a fashion that it hop pseudo-randomly among at least 75 of the 83 available 1 MHz wide frequency slots in the 2.400 to 2.4835 MHz region such that no more than 0.4 seconds are spent in a slot every 30 seconds. Communicating transceivers hop according to a pre-determined pseudo-random hopping sequence that is known to all of them.

The slow frequency hopping mechanism suggests that a channel in SWAN's wireless hop naturally corresponds to a hopping sequence, or a specific permutation of 75 to 83 frequency slots. Channels co-located in the same geographical area should use hopping sequences such that the chances of two different channels beings in the same frequency slot at the same time is minimized, such hopping sequences are weakly orthogonal. In SWAN, 20 to 25 distinct channels are defined with their own hopping sequences and these channels are then distributed among the base stations 18 in various pico-cells. More than one channel can be allocated to a base station 18, and a base station 18 needs to have a separate radio for each channel assigned to it. The same channel cannot be assigned to two base stations 18 in cells 22 that can mutually interfere. The mobile units 20 have only one radios, and at any given time operate in a is specific channel.

Also relevant to the wireless hop design are some of the timing parameters associated with the DE6003 radio transceiver used in SWAN. The radio has a maximum limit of 10 ms on the duration of a continuous transmission, and two periods of such continuous transmissions must be separated by at least 88 $\mu$s. This suggests that, at the data rate of 625 Kbps, a maximum of 6250 bits (or 781.25 bytes) can be transmitted in one burst. Therefore, the maximum size of an air interface packet is 6250 bits. Further, the overhead time to switch from receive to transmit mode is 5.8 $\mu$s maximum, and for the switch from transmit to receive mode is 30 $\mu$s maximum. Compared to the 88 $\mu$s separation between two continual transmissions, these two numbers suggest that from efficiency perspective it is better that a transceiver switch its direction after the 10 ms maximum transmission burst. Another timing parameter that results in overhead is the 80 $\mu$s time taken by the radio to hop from one frequency slot to another.

The radio provides a bit error rate (BER) of 1E-5 maximum for operation in SWAN's environment. This translates into a probability of less than 0.5% that an ATM cell will be lost due to noise. While being a much larger loss probability compared to what is easily available on the wired backbone, this cell loss probability is overshadowed due to frequency slot collision in two co-located channels. For example, if two channels using 75 long frequency hopping sequences collide even once every sequence, a loss of 4% takes place. techniques such as information spreading across frequency slots and smart hopping algorithms are to the first order more crucial in SWAN's wireless hop than techniques targeted at errors only due to noise.

Figure 5:
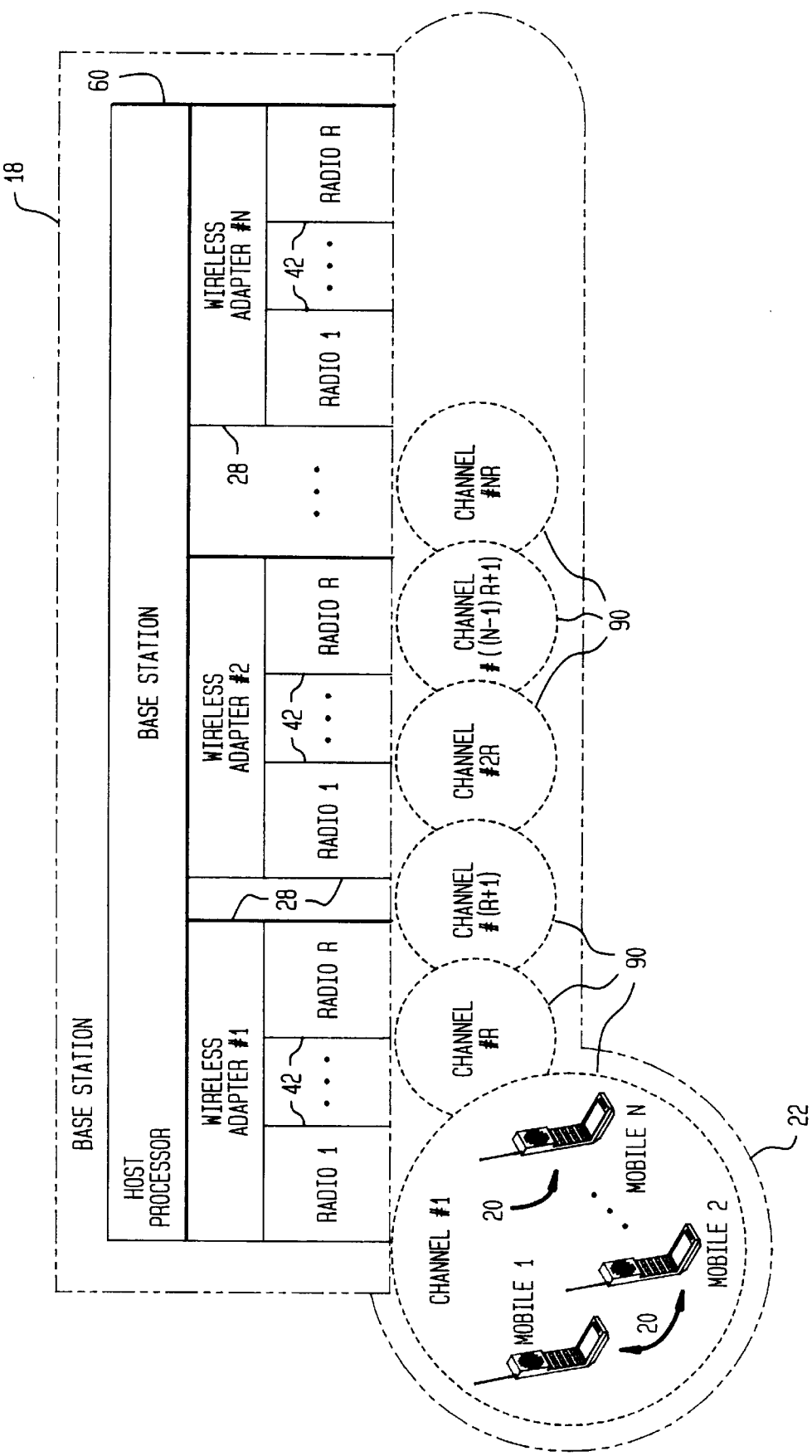
FIG. 5 is a block diagram of a base station and mobile units in SWAN.

FIG. 5 shows the abstract architecture of a typical base station in SWAN. A base station 18 consists of multiple wireless ATM adapter cards 28 plugged into its backplane, with each card 28 handling multiple radio transceivers 42. Each radio transceiver 42 is assigned a channel 90 (frequency hopping sequence) that is different from channels 90 assigned to a radio 42 in the current or neighboring base station 18. Typically, in SWAN, a base station 18 has fewer than 3–5 radios 42 per base station 18. The preceding base station organization results in a cellular structure where each cell is covered by multiple co-located channels. A mobile unit 20 in a cell 22 is assigned to one of the radio ports on the base station 18, and frequency hops in synchrony with it.

Since carrying multimedia traffic to the mobile units 20 is a major goal in SWAN, the two important drivers for the medium access control and physical layer control subsystem were low latency hand-offs and support for multiple simultaneous channels 90 in a given cell 22. In addition, explicit allocation of wireless resources among ATM virtual channel connections is crucial. Finally, at least in the initial implementation, simplicity of implementation was considered desirable. In any case, implementing algorithmic enhancements would be easy because the wireless adapter architecture is based on software and reconfigurable hardware.

In light of these considerations, the basic physical layer strategy used currently in SWAN is to assign each mobile unit 20 in a cell 22 to its own radio port, or channel, on the base station 18. The available 20–25 channels are distributed in a three-way spatial multiplexing, so that there are 7–8 channels available per cell 22, and each base station 18 is accordingly equipped with multiple radio ports. Given that a cell 22 is of the size of a room, this is more than enough for the initially envisaged usage pattern. More demanding usage patterns, such as handling conference rooms, will indeed require the ability to support multiple mobile units 20 per channel. The time between two frequency hops on a channel is called the hop frame, which is sub-divided into link cells or air-interface packets of fixed length. Access to the channel 90 is regulated by a token passing mechanism, with the base station 18 acting as the master for handing out the token. The hand-off is mobile unit initiated which transmits Hand-off Request Link Cells (HRLC) based on measurements of current base station power. On the other hand, base station searches on its idle radio ports for mobile units 20 that are seeking a base station 18. This basic scheme is detailed in the following sub-sections.

The definition of the air-interface packets, and the mapping of ATM cells onto the air-interface packets, depends on the hardware constraints. In SWAN, a standard serial communications controller chip is used in the synchronous mode resulting in the well known Synchronous Data Link Control (SDLC) protocol being used over the air. A SWAN transmitter sends SDLC frames separated by the SDLC SYNC bytes. In order to reduce the interrupt overhead to the software, is a physical layer controller drives the serial communications controller. The physical layer controller accepts data units called link cells or air-interface packets from the medium access control layer, and stuffs them into the SDLC frame sent by the serial communications controller chip. The reverse is true on the receiving end. The physical layer controller needs to be in hardware, and its current implementation in the reconfigurable hardware part of the FAWN wireless adapter in SWAN is based on a design that uses fixed 64-byte sized link cells. The higher level medium access control layer communicates with the physical layer in terms of these 64-byte link cells.

Given the constraint of fixed 64-byte sized link cells, the current scheme uses the simple suboptimal strategy of encapsulating a 53 byte ATM cell to a link cell, with the remaining 11 bytes being used for medium access control header and for error control. In addition to the link cell that encapsulates an ATM cell, several other link cells are also defined for signaling purposes.

Figure 6:
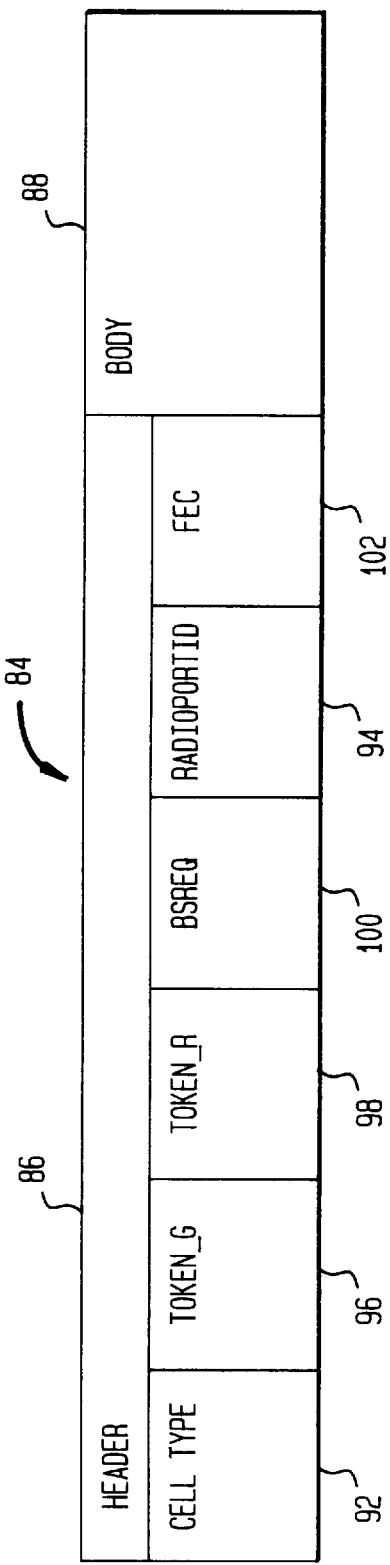
FIG. 6 is an illustration of a format of link cells for air interface packets.

FIG. 6 shows the format of a generic link cell 84. There is a 4 byte header 86 and a 53 byte body 88, and the remaining 7 bytes are currently undefined. The header 86 has fields for Cell Type 92 which is 3 bits, RadioPortID 94 which is 8 bits, and three other fields for medium access control. The medium access control fields consists of a 1 bit Token_G field 96, a 3 bit Token_R_field 98 and a 1 bit BSReq field 100. In addition, the header uses 16 bits for forward error correction (FEC) 102 of the above information. Forward error correction provides for the link cell integrity wherein the transfer of packetized data has a means for error detection and error correction that relies solely on a one-way communication of data bits from a sender to a receiver. The RadioPortID 94 is a logical id assigned by the higher level backbone signaling such that no two radio-ports in radio vicinity have the same id. This logical RadioPortID 94 is mapped by the base station 18 to the wired network address of the base station 18, and the RadioPortID 94 within the base station 18.

Seven type of link cells are defined: ATMLC for encapsulating ATM data cell, CRLC for connection request by a mobile unit that powers up, HRLC for hand-off request by a mobile unit, SYNCLC for idle channel, and CHRLCACK1, CHRLCACK2, and CHRLCACK3 for handshake during registration of a mobile unit at a base station.

The basic protocol for access regulation on a channel is that of token passing, with the base station 18 acting as the central arbiter that decides who gets the token, and hence the transmission privilege. In the one mobile unit 20 per radio port scenario, which is currently the case, this reduces to an exchange of tokens between the mobile unit 20 and the base station 18 to establish full duplex communications. The token can be held for at most N=8 link cell duration, which is slightly less than 10 ms, the length of maximum allowable continuous transmission burst. This maximum interval is used to detect lost tokens in noisy channels. The token information is a part of the link cell header 86, in the form of is two fields: TOKEN_G 96 which is 1 bit and TOKEN_R 98 which is 3 bits. The G field with value 1 is used to indicate that a token is being granted to the receiver (for <=N link cell duration). The R field indicates the number of ATM cells that are queued at the sender, information is used by the base station 18 in scheduling the token. In the case of an idle channel, the control will just pass back-and-forth with G=1, and R=0. Finally, in case the token is lost due to noise, the mobile units do nothing, and time-out, while the base station 18 takes over the control and resets the token passing protocol.

Closely related to the medium access control is the control of frequency hopping. Although the two are logically orthogonal issues, they cannot be separated in an implementation. Instead of using a hopping scheme based on measuring hopping interval in terms of real time, we count the number of token passes to measure the length of the hop frame. In particular, hopping is done after every M=8 token grants from mobile unit 20 to base station 18. Of course, token losses are a nuisance in this scheme, and a straight-forward counting of tokens will not work. We therefore count the effective number of token passes to decide when to hop. The effective number of token passes is the actual number of token passes and the number of time-outs while waiting for token.

It is of particular interest to consider the various wireless hop scenarios. After power-up a mobile unit 20 begins to transmit a "Connection-Request" link cell (CRLC). This transmission is done using a random initial frequency hopping sequence, and is at a fast rate whereby the mobile unit 20 jumps to the next frequency slot in the sequence if no base station 18 responds to the connection request link cell. The body of CRLC consists of the globally unique mobile unit id and a hop sequence id. This information is protected by a forward error correction scheme based on an (8,4) linear code. Following CRLC is a reserved time interval (of length 2×link cell duration) for an interested base station 18 to acknowledge via a CHRLCACK1 cell. Contained in CHRLCACK1 is an 8-bit logical id that the base station 18 assigns to the mobile unit 20 for the duration of mobile unit's connection to the radio port. Following successful reception of CHRLCACK1 by the mobile unit 20, an exchange of CHRLCACK2 and CHRLCACK3 take place to finish the 3-phase handshake that constitutes the mobile unit registration process.

A mobile unit 20 in SWAN continually measures the RF power $P_{current}$ of packets it receives from its base station 18. Further, two power thresholds are defined: $P_{min}$ and $P_{thresh}$, with the latter being greater than the former. When $P_{current}$ falls below $P_{thresh}$ but is still above $P_{min}$, the mobile unit 20 initiates the process of soft hand-off by beginning to periodically transmit a "Hand-off Request" link cell (HRLC) with periodicity proportional to $P_{thresh}-P_{current}$. In addition, the mobile unit sets the "Base station request" bit (BSReq) 100 in the header 86 of all the link cells 84 it transmits. This indicates to idle base stations 18 as well as the current base station 18 that a hand-off is needed. The body 88 of the HRLC consists of the globally unique mobile unit id, a hop sequence id, and the id of the current base station 18. Like in CRLC, the body of HRLC too is protected by an (8,4) forward error correcting linear code 102. The handshake that follows an HRLC is a 3-phase handshake similar to that in the case of a CRLC as described above. In the case when the power $P_{current}$ falls below $P_{min}$, the mobile unit 20 assumes that its connection to the current base station 18 has been lost, and begins to continually transmit HRLC and switches to a fast hop rate. The fast hopping rate not only reduces the effect of frequency collision with other channels, but also reduces the average time to find a new base station 18, thus helping in the goal of low hand-off latency. Of course, the soft hand-off mechanism described earlier is the primary mechanism for low latency hand-offs as it allows registration at a new base station 18 to be done while the communication with the current base station 18 is not broken.

The base station 18 with one or more idle ports actively hunts for mobile units 20 that might want to connect. This is done according to the following process. First, using hints from the backbone, a frequency slot is chosen for the idle radio-port such that none of the radio-ports in the parent base station 18 or on neighboring base stations 18 are using that frequency slot. The idle radio-port hops to the frequency slot thus chosen. Next, it measures power at that frequency and snoops for link cell headers 84. If not activity is detected at that frequency slot, a new frequency is chosen and the hunt restarted. If activity is detected, but link cell headers 84 show that the BSReq 100 bit is not set then the base station 18 assumes that the mobile unit 20 is not interested in a hand-off, and it again restarts the hunt at a new frequency. Otherwise, the base station 18 waits for a CRLC or a HRLC link cell, or for the channel to become idle. If CRCL or HRCL is received, the base station 18 initiates the registration process for the powering-up mobile unit 20 or for the handing-off mobile unit 20, as the case may be. A three-phase handshake involving CHRLCACK1, CHRLCACK2, and CHRLCACK3 is used for this as described earlier.

Consider the interface between ATM Connection Manager and the Medium Access Control Module. In order to schedule the wireless resources among the multiple ATM virtual channel connections going over a wireless channel, the Medium Access Control module maintains a table of per Virtual Channel Connection information. When a new Virtual Channel Connection needs to be opened, the connection manager module sends a request to the Medium Access Control module indicating the bandwidth requirements as the channel time T1 needed by this Virtual Channel Connection over a period of time T2. The Medium Access Control module uses this information to either accept or deny admission to this new Virtual Channel Connection. Further, this bandwidth specification is used by the Medium Access Control module to schedule transmission of cells belonging to different Virtual Channel Connections.

The implementation of the medium access control and physical layer control subsystem for SWAN can be viewed as a three-way hardware-software co-design task where the functionality can be implemented at one of three locations: as software on the base station CPU or the mobile unit CPU, as embedded software on the wireless adapter, and on field programmable hardware on the wireless adapter. In the case of a dumb terminal with an embedded wireless adapter, there is no CPU in the terminal, so that the entire functionality is on the wireless adapter itself. In the current implementation, the physical layer control is implemented on the field programmable hardware on the wireless adapter, the Medium Access Control is implemented as software on the wireless adapter, and the ATM connection manager that Medium Access Control talks to as software either on the base station or mobile unit CPU, or on the wireless adapter itself in the case of a dumb terminal.

Figure 7:
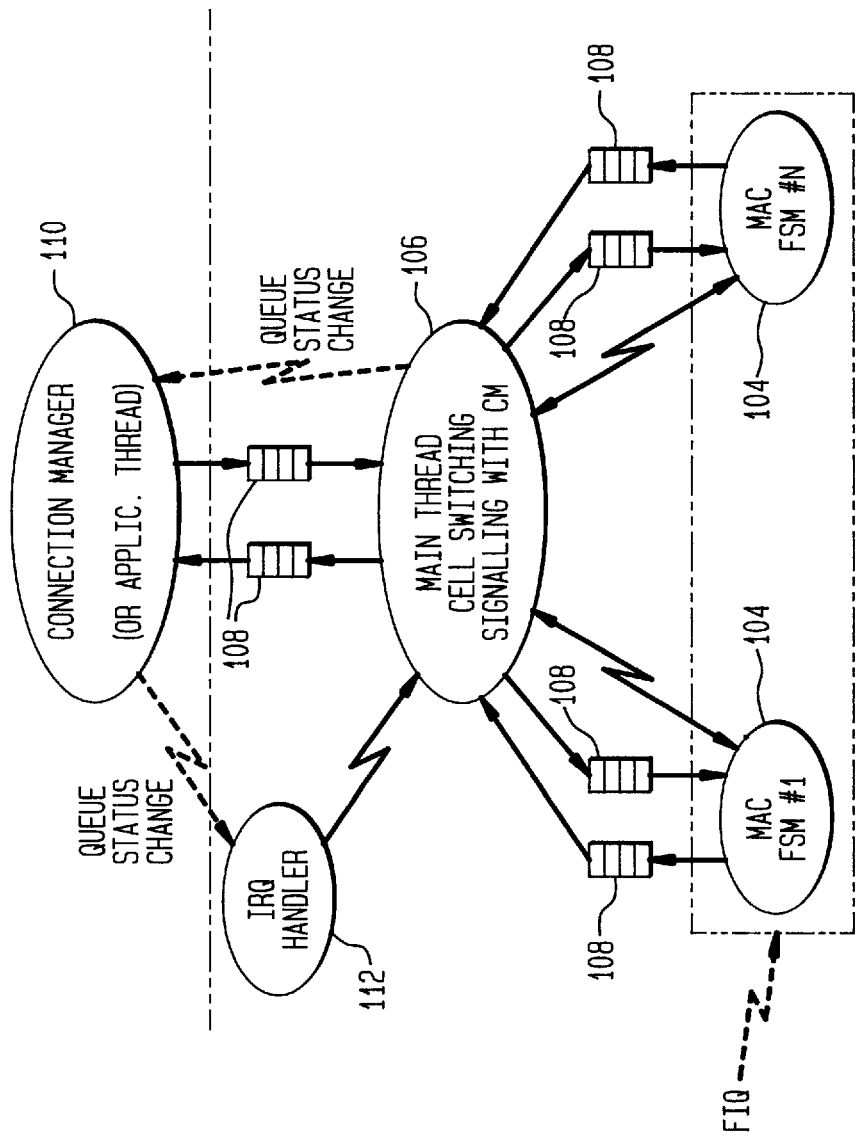
FIG. 7 is a block diagram of embedded software on a wireless adapter.

The organization of the software embedded on the wireless adapter is shown in FIG. 7. The software is organized as a multi-threaded system. The finite state machines corresponding to the Medium Access Control protocol at each radio port are implemented as FSMs 104 running in the interrupt mode. There is one such FSM 104 for each radio port. These can be viewed as very high priority threads. The Medium Access Control FSMs 104 communicate with a main thread 106 that runs in the user mode and handles queue management and dispatching of ATM cells to the Medium Access Control FSMs 104 on one side, and to other threads or to the base station/mobile unit CPU on the other side. The inter-thread communication is done using queues of pointers 108, with the ATM cells themselves being stored in a shared memory area. It is worth pointing out that in the case of dumb terminals with no CPU of their own, the ATM connection manager 10 and the threads that source or sink ATM cells are also run on the embedded CPU (an ARM 610 processor) on the wireless adapter. An IRQ is Handler 112 processes interrupt requests in response to a queue status change.

On-going work is extending the basic token passing medium access control to accommodate ad hoc networks where no a priori base station is present, and do trade-off between forward error correction and wireless link level retransmissions on a per virtual channel connection basis.

Numerous modifications and alternative embodiments of the invention will be apparent of those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

We claim:

1. In a digital communication network comprising at least one base station and at least one endpoint, a system for delivering digital packets between said at least one endpoint and said at least one base station, said system comprising:

transporting means for wirelessly transmitting and receiving said digital packets between said at least one base station and said at least one end point;

a link cell for linking said at least one base station and said at least one end point, said link cell containing a header portion and a body portion, said header portion containing a token, said token enabling said transporting means for wirelessly transporting over a selected channel said packets between said at least one base station and said at least one end point, and said header portion contains a forward error correction code, said forward error correction code providing error detection and error correction that relies solely on a one-way communication of data bits from a sender to a wherein said transporting means is responsive to said link cell for coordinating transfer of said digital packets between said at least one base station and said at least one end point.

2. The system as recited in claim 1 wherein said forward error correction code is an (8,4) linear code.

3. The system as recited in claim 1 wherein said forward error correction code is at least 16 bits.

4. The system as recited in claim 1 wherein said token is utilized to allocate said selected channel from a plurality of channels.

5. In a digital communication network comprising at least one base station and at least one endpoint, a system for delivering digital packets between said at least one endpoint and said at least one base station, said system comprising:

transporting means for wirelessly transmitting and receiving said digital packets between said at least one base station and said at least one end point;

a link cell for linking said at least one base station and said at least one end point, said link cell containing a header portion, a body portion and a token, said header portion contains a radioport id which is a logical id assigned such that each radio-port in a vicinity has a unique id;

wherein said transporting means is responsive to said link cell for coordinating transfer of said digital packets between said at least one base station and said at least one end point and said token is utilized to allocate a selected channel from a plurality of channels.

6. The device as recited in claim 5 wherein said body portion contains packetized data.

7. The device as recited in claim 5 wherein said body portion contains an ATM packet.

8. In a digital communication network comprising at least one base station and at least one endpoint, a system for delivering digital packets between said at least one endpoint and said at least one base station, said system comprising:

transporting means for wirelessly transmitting and receiving said digital packets between said at least one base station and said at least one end point;

a link cell for linking said at least one base station and said at least one end point, said link cell containing a header portion and a body portion, said header portion containing a token, said token enabling said transporting means for wirelessly transporting over a selected channel said packets between said at least one base station and said at least one end point, and said header portion contains a second token, said second token is indicative of a number of packetized data cells queued for transporting;

wherein said transporting means is responsive to said link cell for coordinating transfer of said digital packets between said at least one base station and said at least one end point.

9. In a digital communication network comprising at least one base station and at least one endpoint, a method for delivering digital packets between said at least one endpoint and said at least one base station, said method comprising the steps of:

linking said at least one base station and said at least one end point by providing a link cell, said link cell containing a header portion and a body portion;

providing a token within said header portion, said token enabling said transporting means for wirelessly transporting over a selected channel said packets between said at least one base station and said at least one end point, allocating said selected channel from a plurality of channels by utilizing said token;

providing a second token within said header portion, said second token indicating a number of packetized data cells queued for transporting and transporting wirelessly data packets between said at least one base station and said at least one end point.

10. The method as recited in claim 9 wherein the step of providing a link cell further comprises the step of providing a forward error correction code within said header portion, said forward error correction code providing error detection and error correction that relies solely on a one-way communication of data bits from a sender to a receiver.

11. The method as recited in claim 10 wherein said forward error correction code is an (8,4) linear code.

12. In a digital communication network comprising at least one base station and at least one endpoint, a system for delivering data packets between said at least one endpoint and said at least one base station, said system comprising:

transporting means for wirelessly transmitting and receiving said data packets between said at least one base station and said at least one end point;

a link cell for linking said at least one base station and said at least one end point, said link cell containing a header portion and a body portion, said header portion containing a forward error correction code, a radioport id and a token, said forward error correction code providing error detection and error correction that relies solely on a one-way communication of data bits from a sender to a receiver, said radioport id is a logical id assigned such that each radio-port in a vicinity has a unique id, and said token enabling said transporting means for wirelessly transporting over a selected channel said data packets between said at least one base station and said at least one end point said token is utilized to allocate said selected channel from a plurality of channels;

wherein said transporting means is responsive to said link cell for coordinating transfer of said data packets between said at least one base station and said at least one end point.

\* \* \* \* \*

UNITED STATES PATENT AND TRADEMARK OFFICE
CERTIFICATE OF CORRECTION

PATENT NO.     : 5,774,461
DATED          : June 30, 1998
INVENTOR(S)    : Eoin Hyden et al.

It is certified that error appears in the above-identified patent and that said Letters Patent is hereby corrected as shown below:

Column 11,
Line 59, please insert -- receiver; -- before "wherein".

Signed and Sealed this

Twenty-first Day of January, 2003

JAMES E. ROGAN
*Director of the United States Patent and Trademark Office*